W. F. COLLIER.
Wire-Dish Stands.
No. 166,346.　　　　　　　　　　Patented Aug. 3, 1875.
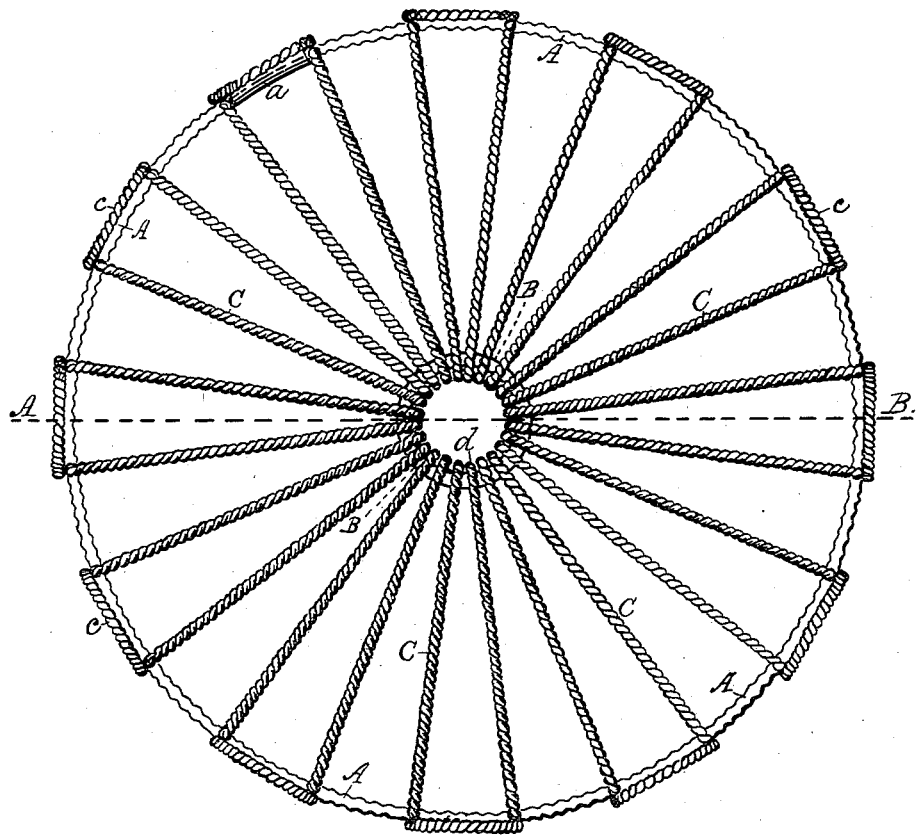
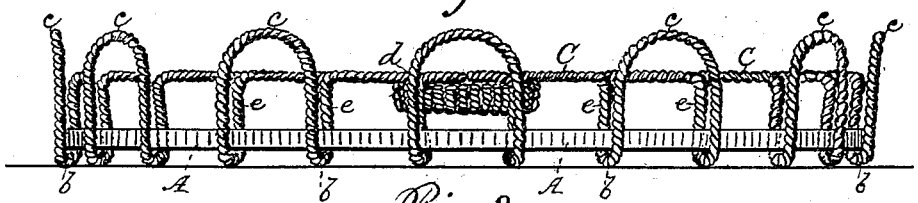
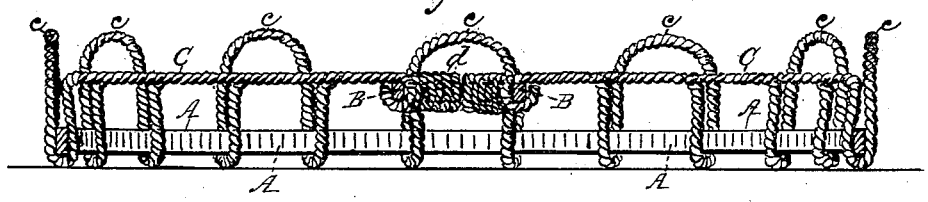
WITNESSES;
Edwin E. Moor
Thos. H. Dodge
INVENTOR;
William F. Collier

UNITED STATES PATENT OFFICE.

WILLIAM F. COLLIER, OF WORCESTER, MASSACHUSETTS.

IMPROVEMENT IN WIRE DISH-STANDS.

Specification forming part of Letters Patent No. 166,346, dated August 3, 1875; application filed July 13, 1875.

*To all whom it may concern:*

Be it known that I, WILLIAM F. COLLIER, of the city and county of Worcester and Commonwealth of Massachusetts, have invented certain new and useful Improvements in Wire Stands for Table and other Use; and I do hereby declare the following to be a full, clear, and exact description of the same, reference being had to the accompanying drawings forming a part of this specification, and in which—

Figure 1 represents a top or plan view of my improved wire stand. Fig. 2 represents a side view; and Fig. 3 represents a section on line A B, Fig. 1.

To enable those skilled in the art to which my invention belongs to make and use the same, I will proceed to describe it more in detail.

In the drawings, the part marked A represents the lower and outer ring, B the inner and upper ring, and C the uniting-wires by which the two rings are secured together, while at the same time an elevated stand is produced for supporting articles such as tea and coffee pots a short distance above the table, said stand having combined therewith outer guards for preventing the articles from slipping off of the stand, and also to insure the article being placed in proper position upon the stand before the removal of the hand of the attendant therefrom. The base wire in this instance is made of flattened and corrugated wire, with its ends united by a metallic or tin clasp or thimble-piece, *a*. Said base wire rests and is secured in the lower bends *b* of the connecting-wires C, the lower ends of said bends forming feet upon which the stand rests, as fully indicated in Figs. 2 and 3 of the drawings. Two bends, *b*, are connected by means of an outer upward-curved part, *c*, in this instance, which extends a little above the horizontal part of the wires C. The inner parts of the bends *b* extend up, as shown at *e e*, from the tops of which the ends of the wire C converge until they reach the central ring B, around which they are hooked and securely fastened, as indicated at *d*.

I prefer to make the parts C *c* and *e* and *b* of twisted wire, and after the parts have been properly secured together, finish the stand by immersing or dipping it in melted tin or other suitable material.

By extending the loop or circle part *c* up upon the outside of the base ring B, and above the horizontal plane of the wires C, the article is much improved in appearance, while at the same time said loops *c* afford protection against the accidental displacement of the tea or coffee pot or other article which may be placed upon the stand. They also render it impossible for a person to place a tea or coffee pot or other article in an unsafe position upon the stand without such fact being brought to their attention before the hand is removed from the article, since, if the bottom of the tea-pot or other article is placed so as to strike upon the top of one of the loops *c*, it will be suddenly canted, thus attracting the attention of the person to improper placing of the article.

The stand may, if desired, be made with the loops *c* extending up above the base A at a greater or less distance.

Having described my improvements in wire stands for table and other use, what I claim therein as new, and of my invention, and desire to secure by Letters Patent, is—

1. The combination, with the outer and inner rings A and B, of horizontal wires C, having bends *b*, *c*, and *e*, substantially as and for the purposes set forth.

2. The wire C, bent at *c* in the form shown, to unite the legs of the said wire C and provide a projecting flange for the tray, substantially as described.

WILLIAM F. COLLIER.

Witnesses:
 EDWIN E. MOORE,
 THOS. H. DODGE.